United States Patent
Cardone et al.

(10) Patent No.: US 8,092,135 B2
(45) Date of Patent: Jan. 10, 2012

(54) DEVICE FOR FASTENING SUPERIMPOSED ELEMENTS

(75) Inventors: Michele Cardone, Trezzano (IT); Giovanni Cosmai, Rescaldina (IT); Roberto Faranda, Milan (IT); Antonino Giglio, Pero (IT)

(73) Assignees: Tecnomagnete S.p.A., Lainate Mi (IT); Politecnico Di Milano, Milan (IT)

( * ) Notice: Subject to any disclaimer, the term of this patent is extended or adjusted under 35 U.S.C. 154(b) by 0 days.

(21) Appl. No.: 12/664,981

(22) PCT Filed: Apr. 14, 2008

(86) PCT No.: PCT/IT2008/000243
§ 371 (c)(1),
(2), (4) Date: Dec. 16, 2009

(87) PCT Pub. No.: WO2008/155787
PCT Pub. Date: Dec. 24, 2008

(65) Prior Publication Data
US 2010/0183401 A1    Jul. 22, 2010

(30) Foreign Application Priority Data

Jun. 19, 2007 (IT) .............................. MI2007A1227

(51) Int. Cl.
*F16B 35/00* (2006.01)
(52) U.S. Cl. ....................................... 411/389; 411/388
(58) Field of Classification Search .......................... None
See application file for complete search history.

(56) References Cited

U.S. PATENT DOCUMENTS

| | | | | |
|---|---|---|---|---|
| 2,771,262 | A | | 11/1956 | Laystrom |
| 5,516,166 | A | * | 5/1996 | Frolov et al. ................ 292/251.5 |
| 5,641,187 | A | * | 6/1997 | Frolov ......................... 292/251.5 |
| 6,053,920 | A | * | 4/2000 | Carlsson et al. .............. 606/304 |
| 6,361,258 | B1 | | 3/2002 | Heesch |
| 6,609,738 | B1 | * | 8/2003 | Roth et al. .................. 292/251.5 |
| 6,902,214 | B2 | * | 6/2005 | Smith .......................... 292/251.5 |

FOREIGN PATENT DOCUMENTS
WO    WO 2006/021812    3/2006

OTHER PUBLICATIONS
International Search Report for PCT/IT2008/000243, mailed Mar. 5, 2009.
Written Opinion of the International Searching Authority for PCT/IT2008/000243, Mar. 5, 2009.

* cited by examiner

Primary Examiner — Gary Estremsky
(74) Attorney, Agent, or Firm — Nixon & Vanderhye PC

(57) ABSTRACT

The present invention relates to a device for fastening two elements to one another, comprising a rod-like member having opposite ends which are aligned on a common longitudinal axis (X-X) and a threaded portion formed in the region of a first end. A characteristic of the rod-like member is that it comprises a tapered portion formed in the external wall of the rod-like member, the tapered portion having the vertex of its taper facing towards the threaded portion and a taper angle ($\alpha$), measured relative to the longitudinal axis (X-X), that is within a range variable between 2° and 6°.

12 Claims, 4 Drawing Sheets

DEVICE FOR FASTENING SUPERIMPOSED ELEMENTS

This application is the U.S. national phase of International Application No. PCT/IT2008/1000243 filed 14 Apr. 2008, which designated the U.S. and claims priority to Italy Application No. MI2007A001227 filed 19 Jun. 2007, the entire contents of each of which are hereby incorporated by reference.

The present invention relates to a fastening device, particularly but not exclusively for magnetic appliances, according to the preamble to Claim 1.

In the following description, the term "magnetic anchoring appliance" means:
- a permanent magnetic appliance, that is, an appliance which does not need an electrical power supply during its use at the anchoring stage or during the stage of the modification of its activation state, and which is formed with permanent magnets suitably arranged within the appliance;
- an electro-permanent magnetic appliance, that is, an appliance which does not need an electrical power supply during its use at the anchoring stage but which needs an electrical power supply during the activation and de-activation stage and which is formed with reversible permanent magnets and, if necessary, static permanent magnets arranged suitably within the appliance;
- an electro-magnetic appliance, that is, an appliance which needs an electrical power supply during its use at the anchoring stage and the magnetic core of which is made of ferromagnetic material.

According to the prior art, two or more plate-like elements are joined together, in particular to form a magnetic plate of a magnetic appliance, by means of a plurality of conventional screw members such as, for example, screws, bolts, etc.

In particular, as is well known in the art, a magnetic appliance comprises a frame and a plurality of magnetic pole pieces which define the magnetic surface.

To enable the magnetic pole pieces to be connected to the frame, both the frame and the magnetic pole pieces are provided with holes which the screw members can engage so as to clamp each magnetic pole piece to the frame.

Moreover, a pole extension may be associated with the magnetic pole piece of the magnetic appliance by screwing the pole extension into a further hole formed in the magnetic pole piece.

Figure 1:
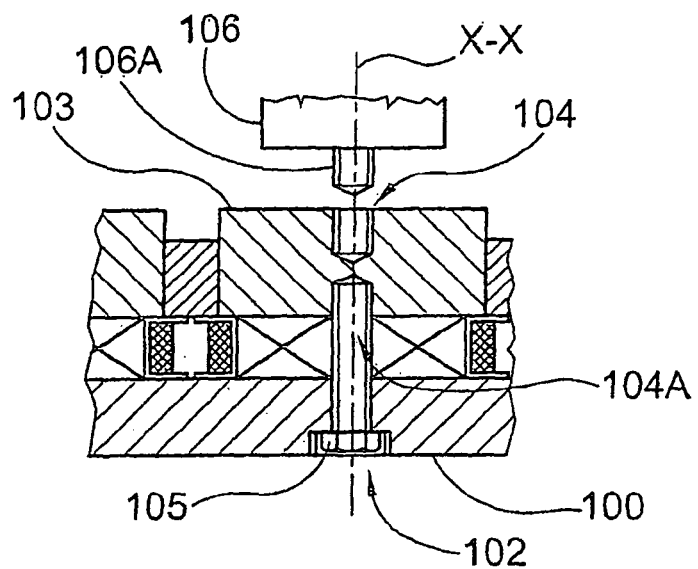

In particular, and with reference to FIG. 1 which shows a section through a frame 100 of a magnetic appliance, the prior art provided for the formation of a first through-hole 102 extending through the thickness of the frame 100 and two blind threaded holes 104 and 104A formed in the magnetic pole piece 103.

The holes 102, 104 and 104A extend along a common longitudinal axis X-X.

It is useful to point out that a screw 105 can be arranged in the through-hole 102 and can create a male-and-female screw connection with the blind hole 104A so as to clamp the magnetic pole piece 103 to the frame 100.

The blind threaded hole 104 has the task of creating a male-and-female screw connection with a screw 106A of a pole extension 106 so as to clamp the pole extension 106 to the magnetic pole piece 103.

The formation of the holes 102 and 104, 104A thus requires several lengthy and expensive machining operations to be performed on the frame 100 and on the magnetic pole piece 103.

In fact, in order to form the holes 104 and 104A, the magnetic pole piece 103 is first of all machined on one surface in order to form, for example, the hole 104 and is then turned through 180° in order to form the hole 104A on the other surface.

Moreover, in order to insert the screw 105 in the hole 102 so as to clamp the magnetic pole piece 103 to the frame 100, the frame 100 is also turned through 180° once the hole 102 has been formed, and the lead-in for the screw 105 is then formed so as to facilitate its insertion in the hole 102.

It is therefore clear that there may be disadvantages due both to the large number of parts making up the fastening elements and to the numerous and diverse machining operations for the preparation of the holes.

The problem is even more acute when the magnetic appliance has a weight and size such that specific machines have to be used for positioning it and/or turning it over both during the machining stages for the formation of the holes and during the assembly stages for the insertion of the screws, as well as for the clamping operations.

A further problem may arise when the pole extension 106 is clamped to the magnetic pole piece 103 by means of the screw 106A.

In this case, since the hardness of the material of the screw 106A of the pole extension 106 is greater than the hardness of the material forming the magnetic pole piece 103, the thread in the hole 104 formed in the magnetic pole piece 103 may be stripped as a result of several operations to fix/extract the pole extension 106, with clear and imaginable consequences.

Moreover, to ensure an adequate resisting section of the hole 104 when the screw 106A is housed therein, the magnetic pole piece 103 must necessarily have a height greater than that which it could have if the pole extension were not associated with it.

Clearly, a thicker magnetic pole piece leads to increased production costs.

Figure 2:
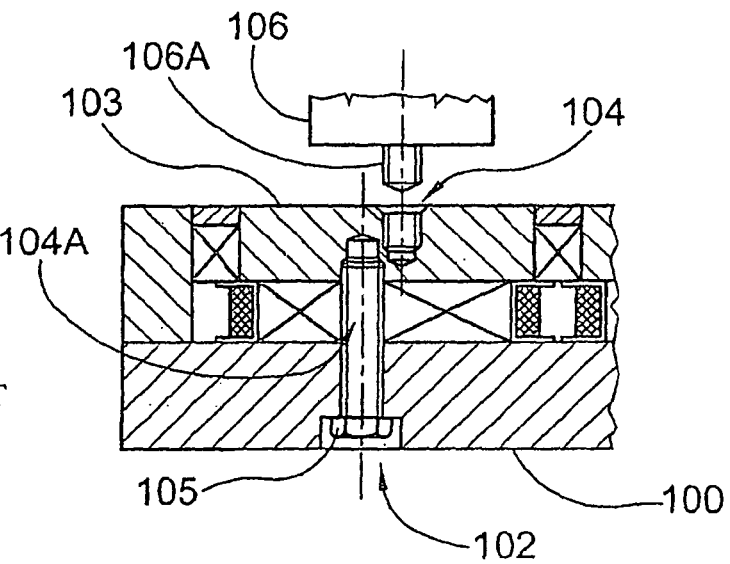

To prevent this problem, and with reference to FIG. 2, the prior art provided for the hole 104 and the hole 104A to be offset relative to one another, that is, for the axis of the hole 104 not to coincide with the axis of the hole 104A the axis of which does, however, coincide with the axis of the through-hole 102.

This reduces the thickness of the magnetic pole piece 103, permitting considerable economic savings associated with reduced material consumption and with the mechanical operations that are avoided.

It can therefore be seen that, to form a magnetic plate, it is necessary to use several separate fastening elements for each point of connection of the magnetic pole piece to the frame and of the pole extension to the magnetic pole piece, with the need for separate machining operations.

Figure 3:
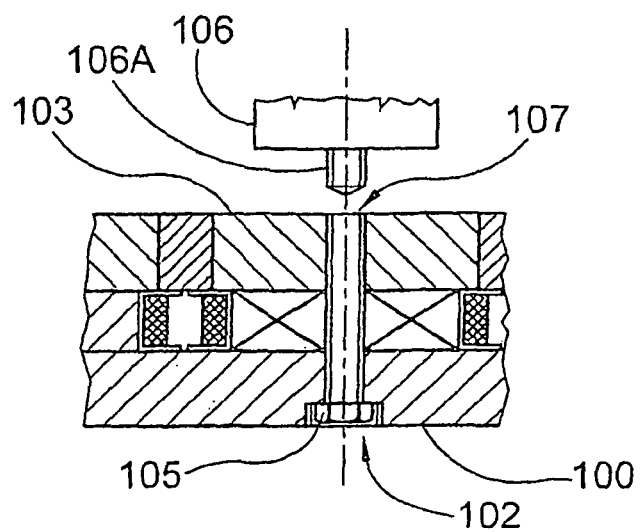

In an alternative known solution, and with reference to FIG. 3, the number of machining operations can be reduced by forming a single, threaded through-hole 107 extending through the cross-section of the magnetic pole piece 103.

However, it is still necessary to machine the frame 100 to form the through-hole 102.

It should be noted that the axis of the hole 107 coincides with the axis of the hole 102 so that the magnetic pole piece 103 can be restrained on the frame 100 by means of the screw 105 and the screw 106A of the pole extension 106 can be inserted in the through-hole 107 in order to restrain the pole extension 106 on the magnetic pole piece 103.

However, although this solution has the undeniable advantage that it requires only one machining operation on the magnetic pole piece 103 and the thickness of the magnetic pole piece as well as of the magnetic appliance can be limited in comparison with the embodiment shown in FIG. 1, on the other hand it has the great disadvantage that it is not watertight and, unless suitable seals are fitted, damaging infiltrations of moisture and of liquids may occur into the space in each hole 107 formed in the magnetic pole pieces 103 of the magnetic appliance.

The object of the present invention is to propose a fastening device which overcomes the disadvantages discussed with reference to the above-mentioned prior art.

This object is achieved by a fastening device and by a fastening system formed in accordance with appended Claim 1 and in accordance with appended Claim 11, respectively.

By virtue of the present invention it is therefore possible to clamp two or more elements to one another as an assembly.

Moreover, by virtue of the present invention, when the fastening device is used in magnetic appliances:
- the machining operations can be performed on only one side of the anchoring plate, affording considerable savings in both execution times and costs;
- there is no need to thicken the magnetic pole piece and a firm and durable anchorage is also ensured for the pole extension;
- both water-tightness and an absence of penetration of solid residues produced by machining operations inside the frame of the magnetic appliance are ensured.

Figure 4:
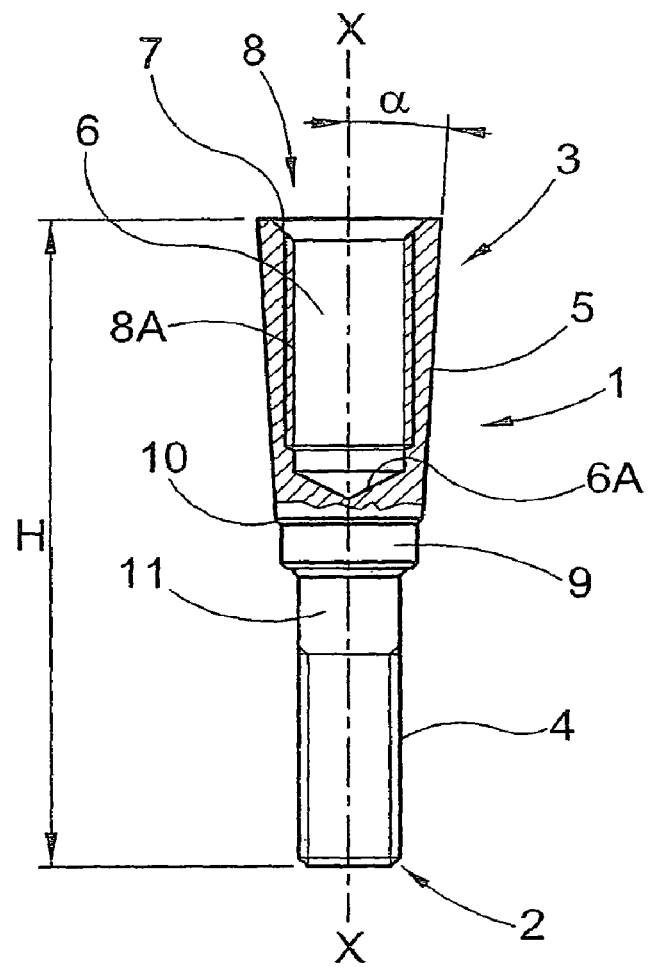
Figure 5:
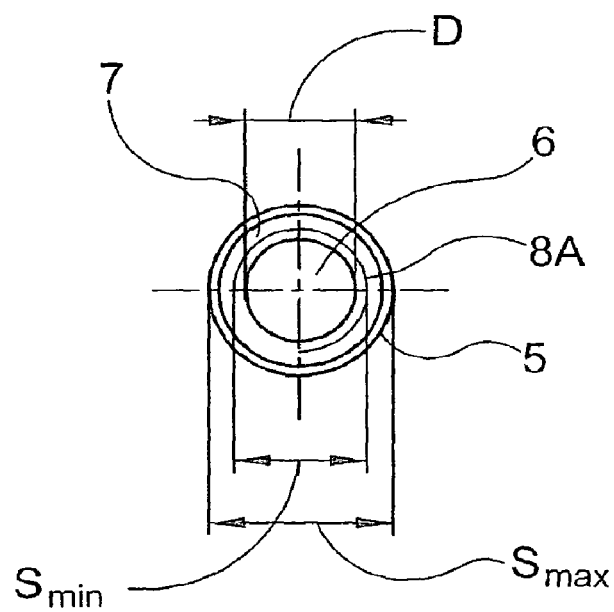
Figure 6:
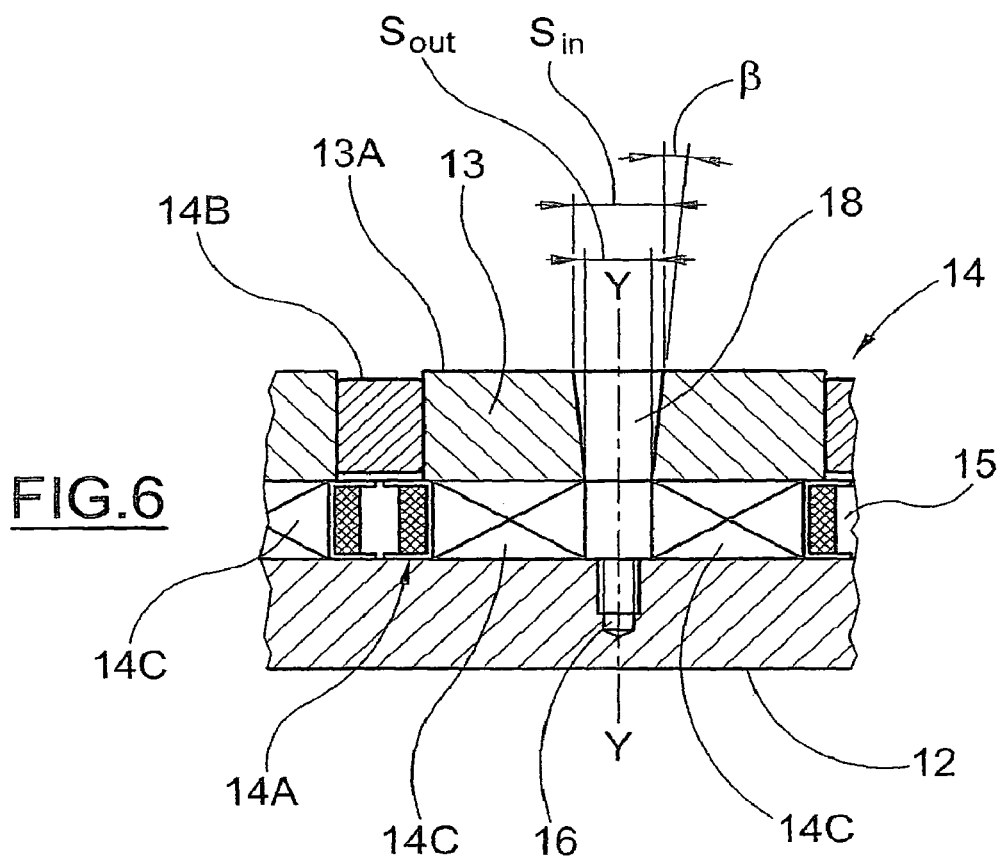
Figure 7:
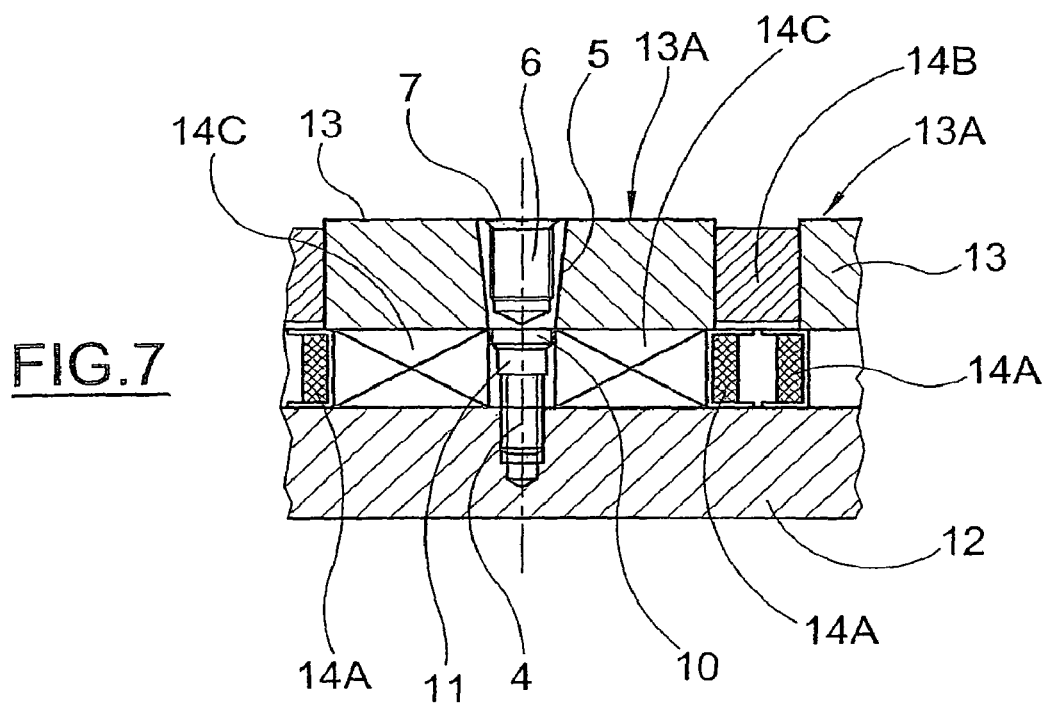
Figure 8:
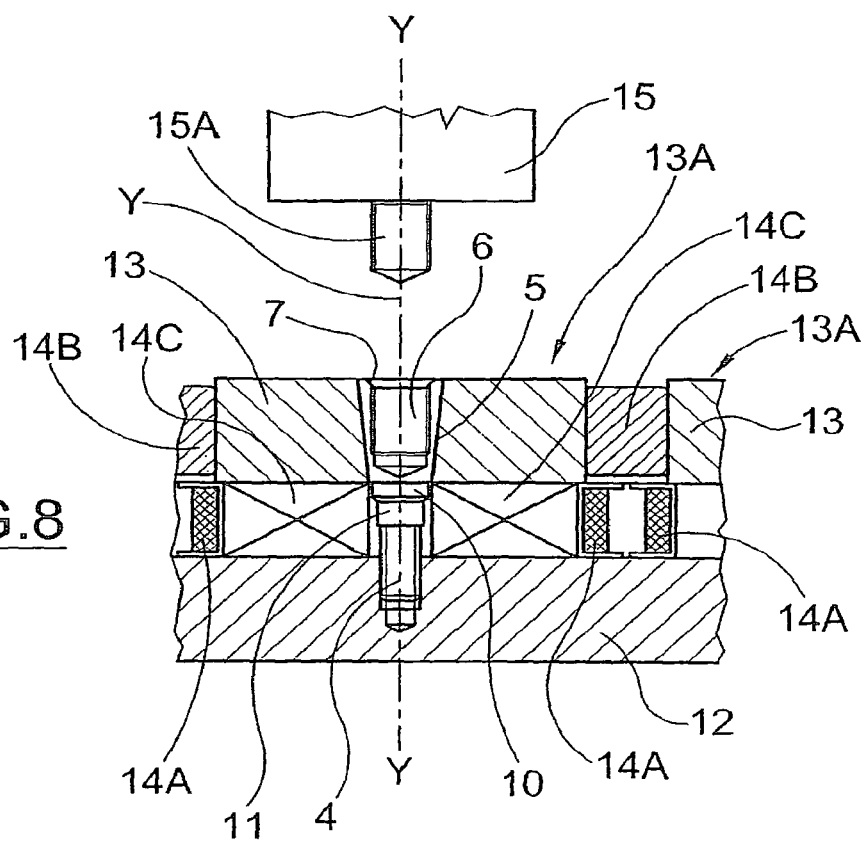

The characteristics and the advantages of the present invention will become clearer from the following detailed description of a practical embodiment thereof which is illustrated by way of non-limiting example in the appended drawings, in which:

FIG. 1 is a cross-section through a magnetic plate of a magnetic appliance with a pole extension arranged above the magnetic plate in order to be fitted thereon in accordance with the prior art, FIG. 2 is a cross-section through another magnetic plate of a magnetic appliance with a pole extension arranged above the magnetic plate in order to be fitted thereon in accordance with the prior art, FIG. 3 is a cross-section through a further magnetic plate of a magnetic appliance with a pole extension arranged above the magnetic plate in order to be fitted thereon, according to the prior art, FIG. 4 is a side view, partially in longitudinal section, of a fastening device according to the invention, FIG. 5 is a view of the device of FIG. 4 from above, FIG. 6 is a cross-section through a magnetic plate of a magnetic appliance without a pole extension, with a hole ready to receive the fastening device of FIG. 4, FIG. 7 is a cross-section through a magnetic plate without pole extensions, such as that of FIG. 6, with a fastening device inserted, and FIG. 8 is a section through a magnetic plate such as that of FIG. 7, with a pole extension arranged above the magnetic plate in order to be fitted thereon.

With reference to FIGS. 4 to 8, these show a fastening device comprising a rod-like member 1 which preferably has a circular cross-section and the ends 2 and 3 of which are aligned on a common longitudinal axis X-X.

A threaded portion 4 is formed in the region of the end 2 and a tapered portion 5 is formed in the region of the opposite end 3, with the vertex of the taper facing towards the threaded portion 4.

It is useful to point out that the tapered portion 5 is formed on the external wall of the rod-like member 1 and extends along a predominant portion of the rod-like member 1.

In a preferred embodiment, the tapered portion 5 extends for a distance of at least 40% of the height H of the fastening device 1.

For the reasons which will become clearer from the following description, the taper angle $\alpha$ of the portion 5 relative to the longitudinal axis X-X is within a range of values variable between 2° and 6°, preferably between 2.5° and 3.5° and, even more preferably, is 3°.

The rod-like member 1 comprises engagement means 8 formed in the region of the second end 3.

In particular, in a preferred embodiment, the engagement means 8 comprise an axial cavity 6 which has an opening diameter D and in which a female thread 8A is formed.

The cavity 6 may, for example, be a cavity with a blind end, preferably of circular cross-section.

The cavity 6 has a flared mouth 7.

It is useful to point out that the axial cavity 6 extends for a depth of at least 1.5 times the diameter D.

Alternatively, the engagement means 8 may take the form of a bayonet coupling or a snap coupling, etc.

The rod-like member 1 further comprises at least one cylindrical portion 9 interposed between the threaded portion 4 and the tapered portion 5.

The diameter of the cylindrical portion 9 is less than the diametral dimension of an end portion 10 of the tapered portion 5.

In the embodiment illustrated, a cylindrical shank 11 having a diameter equal to the outside diameter of the thread 4 is positioned between the cylindrical portion 9 and the threaded portion 4.

With reference now to FIGS. 6, 7 and 8, these show a preferred use of the device according to the invention.

The rod-like member 1 is advantageously used in the formation of magnetic plates for magnetic appliances, the operation of which is known to a person skilled in the art and will not be described, the rod-like member 1 acting as a fastening device or element between the various elements making up such magnetic plates.

For the purposes of the present description, it should be stressed that a magnetic appliance of this type comprises, basically:
- a frame 12;
- a magnetic pole piece 13 defining an anchoring surface 13A (or magnetic plate);
- means 14 for activating the magnetic pole piece such as, for example, solenoids 14A and magnetic materials 14B (static permanent magnet) and 14C (reversible permanent magnet); and
- a pole extension 15 which can be associated with the magnetic pole piece 13.

As shown in FIGS. 6 and 7, the frame 12 has a threaded hole 16, which is preferably a blind hole, positioned in the region of each magnetic pole piece 13 with which the pole extension 15 is to be associated, as will become clearer from the following description.

As is also shown in FIG. 6, the magnetic pole piece 13 has a respective through-hole 18 which is aligned with the axis of the threaded hole 16 and has a taper angle $\beta$ that is within a range of values variable between 2° and 6°, preferably between 2.5° and 3.5° and, even more preferably, is 3°, measured relative to the axis Y-Y on which the holes 16 and 18 are aligned.

The through-hole 18 is preferably a tapered through-hole.

The magnetic pole piece 13 is fastened to the frame 12 by the insertion of the rod-like member 1 through the tapered through-hole 18 of the magnetic pole piece 13 and the screwing of the threaded end 4 into the blind threaded hole 16 of the frame 12.

The threaded portion 4 is screwed into the blind hole 16 by means of a suitable tool which is not shown in the drawings since it is conventional and which is temporarily anchored in the cavity 6 and fastened, for example, to the thread 8A.

Upon completion of the screwing operation, the tapered portion 5 of the member 1 is fitted firmly in the corresponding tapered hole 18 of the magnetic pole piece 13.

In other words, the tapered hole 18 has surfaces which can mate with the surface of the tapered portion 5 of the rod-like member 1 along the entire periphery so that they can combine to ensure optimal sealing.

In particular, each through-hole of the plurality of through-holes 18 has an inlet cross-section $S_{in}$ and an outlet cross-section $S_{out}$ (see FIG. 6), with reference to the direction of insertion of the rod-like member 1 in the through-hole 18, whereas the tapered portion 5 of the rod-like member 1 extends between a larger cross-section $S_{max}$ and a smaller cross-section $S_{min}$ (see FIG. 5), wherein:

the inlet cross-section $S_{in}$ of the through-hole 18 has dimensions such as to permit the insertion of the smaller cross-section $S_{min}$ of the rod-like member 1 and, at the same time the outlet cross-section $S_{out}$ of the through-hole 18 has dimensions such as to prevent the passage of the larger cross-section $S_{max}$ of the rod-like member 1.

It is also useful to point out that the solenoids 14A and the magnetic materials 14B are enclosed and firmly clamped between the frame 12 and the magnetic pole piece 13.

By virtue of the forced form fit between the tapered portion 5 and the tapered hole 18, which have angles α and β that are equal to one another, and by virtue of the fact that the threaded hole 16 of the frame 12 is not a through-hole, the fastening system according to the invention is thus leaktight without the need to use seals and does not allow liquids or moisture to infiltrate into the frame 12.

In case the rod-like member 1 should need to be removed from the magnetic appliance, the base 6A of the axial cavity 6 may have a profile which can create a form fit with the profile of a suitable tool so that the threaded end 4 can be unscrewed from the blind threaded hole 16 of the frame 12 by the exertion of a suitable torque by means of the tool and the rod-like member 1 can be removed from the magnetic pole piece 13.

With reference to FIGS. 7 and 8 it is pointed out that, upon completion of its insertion in the frame 12, the tapered portion 5 is inserted fully in the tapered hole 18.

Should the end 3 of the fastening device 1 extend beyond the plane of the anchoring surface 13A of the magnetic pole piece 13, it can be made flush by suitable machining operations.

After the tool used for the insertion of the device 1 has been removed, the axial cavity 6 of the tapered portion 5 remains accessible and is used to fit the respective pole extensions 15 in the regions of the respective magnetic pole pieces 13, as shown in FIG. 8.

The various pole extensions 15 are fitted by screwing the screws 15A into the cavities 6 of the tapered portions 5 of the respective members inserted in the magnetic pole pieces 13 and in the frame 12 of the magnetic appliance.

The foregoing description relates to a typical example of the application of the fastening device of the invention without thereby imposing any limitation on the use of the device.

Naturally, in order to satisfy contingent and specific requirements, a person skilled in the art will be able to apply to the above-described configurations many modifications and variations all of which, however, are included within the scope of protection of the invention as defined in the appended claims.

The invention claimed is:

1. A fastening system for fastening two elements together, comprising:
    a rod-like member (1) having opposite ends (2, 3) which are aligned on a first longitudinal axis (X-X) and a threaded portion (4) formed in the region of a first end (2), the rod-like member (1) having a tapered portion (5) formed in the external wall of the rod-like member (1), the tapered portion (5) having the vertex of its taper facing towards the threaded portion (4) and a taper angle (a), measured relative to said first longitudinal axis (X-X);
    a first element (13) of said two elements having a plurality of through-holes (18), each through-hole (18) being engageable with a form fit by the tapered portion (5) of said rod like member (1),
    a second element (12) of said two elements having a plurality of threaded holes (16) each threaded hole (16) being engageable, with a male-and-female screw connection, by the threaded portion (4) of said rod-like member (1), each through-hole (18) being aligned with a respective threaded hole (16) along a second longitudinal axis (Y-Y), said first element (13) is a magnetic pole piece of a magnetic appliance and the second element (12) of the two elements is a frame of the magnetic appliance,
    the plurality of through-holes (18) have an inlet cross-section (Sin) and an outlet cross-section ($S_{out}$), with reference to the direction of insertion of the rod-like member (1) in the through-hole (18), and the tapered portion (5) of the rod-like member (1) extends between a larger cross-section ($S_{max}$) and a smaller cross-section ($S_{min}$), the inlet cross-section ($S_{in}$) of the through-hole (18) has dimensions such as to permit the insertion of the smaller cross-section ($S_{min}$) of the rod-like member (1) and at the same time, the outlet cross-section ($S_{out}$) of the through-hole (18) has dimensions such as to prevent the passage of the larger cross-section ($S_{max}$) of the rod-like member,
    said rod-like member (1) comprises engagement means (8) formed in the region of the second end (3),
wherein said engagement means (8) comprise an axial cavity (6) in which a female thread (8A) is formed.

2. A fastening system for fastening two elements together according to claim 1, wherein the axial cavity (6) is a cylindrical axial cavity.

3. A fastening system for fastening two elements together according to claim 1, wherein the bottom of the axial cavity (6) has a base which is shaped to create a form fit with the profile of a tool.

4. A fastening system for fastening two elements together according to claim 1, wherein the axial cavity (6) in which a female thread (8A) is formed can be engaged by a screw (15A) of a pole extension (15).

5. A fastening system for fastening two elements together according to claim 1, wherein each through-hole of the plurality of holes (18) is a tapered through-hole having a taper angle (β), measured relative to said second longitudinal axis (Y-Y), within a range variable between 2° and 6°, the tapered hole having surfaces which can mate with the surface of the tapered portion (5) of the rod-like member (1) along the entire periphery in order to combine to form a seal, said taper angle (α) of the rod-like member (1) being measured relative to the first longitudinal axis (X-X), that is within a range variable between 2° and 6°.

6. A fastening system for fastening two elements together according to claim 5, wherein the taper angle (β) of the tapered through-hole (18) is between 2.5° and 3.5°.

7. A fastening system for fastening two elements together according to claim 1, wherein the plurality of threaded holes (16) of the said second element (12) are blind threaded holes.

8. A fastening system for fastening two elements together according to claim 1, wherein the taper angle (α) of the rod-like member (1) is between 2.5° and 3.5°.

9. A fastening system for fastening two elements together according to claim 1, wherein the tapered portion (5) of the rod-like member (1) is formed in the region of a second end (3) of the rod-like member (1).

10. A fastening system for fastening two elements together according to claim 9, wherein the tapered portion (5) of the rod-like member (1) extends along a predominant part of the rod-like member (1).

11. A fastening system for fastening two elements together according to claim 1, wherein the rod-like member (1) comprises at least one cylindrical portion (9) interposed between the tapered portion (5) and the threaded portion (4).

12. A fastening system for fastening two elements together according to claim 11, wherein the cylindrical portion (9) has a diameter smaller than or equal to the diameter of that end portion (10) of the tapered portion (5) which faces towards the threaded portion (4).

* * * * *